United States Patent
Shimizu et al.

(10) Patent No.: US 6,280,852 B1
(45) Date of Patent: Aug. 28, 2001

(54) PROCESS FOR PRODUCING LAMINATED STEEL SHEET, LAMINATED STEEL SHEET, AND SURFACE-TREATED STEEL SHEET USED THEREFOR

(75) Inventors: Nobuyoshi Shimizu; Masao Komai, both of Yamaguchi; Ayumu Taniguchi, Tokyo, all of (JP)

(73) Assignee: Toyo Kohan Co., Ltd., Tokyo (JP)

( * ) Notice: Subject to any disclaimer, the term of this patent is extended or adjusted under 35 U.S.C. 154(b) by 0 days.

(21) Appl. No.: 09/068,095

(22) PCT Filed: May 2, 1996

(86) PCT No.: PCT/JP96/01202

§ 371 Date: Sep. 21, 1998

§ 102(e) Date: Sep. 21, 1998

(87) PCT Pub. No.: WO97/16582

PCT Pub. Date: May 9, 1997

(30) Foreign Application Priority Data

Nov. 2, 1995 (JP) .................................................. 7-309857

(51) Int. Cl.[7] .............................. B32B 15/08; C25D 11/38
(52) U.S. Cl. .......................... 428/458; 428/472; 427/405; 427/407.1; 205/319; 205/320
(58) Field of Search ..................................... 428/457, 458, 428/472, 701, 702; 205/319, 320, 333; 427/404, 405, 407.1

(56) References Cited

U.S. PATENT DOCUMENTS

| | | | | |
|---|---|---|---|---|
| 4,432,845 | * | 2/1984 | Ogata et al. | 204/56 |
| 4,511,631 | * | 4/1985 | Fujimoto et al. | 428/632 |
| 4,578,319 | * | 3/1986 | Shimizu et al. | 428/632 |
| 5,389,451 | * | 2/1995 | Ooniwa et al. | 428/612 |

FOREIGN PATENT DOCUMENTS

| | | |
|---|---|---|
| 1-280531 | 11/1989 | (JP) . |
| 3-239538 | 10/1991 | (JP) . |
| 5-069508 | 3/1993 | (JP) . |
| 6-039963 | 2/1994 | (JP) . |
| 6-101092 | 4/1994 | (JP) . |
| 6-114999 | 4/1994 | (JP) . |
| 7-138786 | 5/1995 | (JP) . |
| 7-195616 | 8/1995 | (JP) . |

* cited by examiner

*Primary Examiner*—Deborah Jones
*Assistant Examiner*—Bryant Young
(74) *Attorney, Agent, or Firm*—Browdy and Neimark

(57) ABSTRACT

A laminated steel sheet of the present invention has a surface-treated steel sheet with an outermost chromium oxide having specific surface area of 1.08 to 1.35 as a base sheet, and a plastic film is laminated on at least one side of the base sheet, and has excellent in tenacious adhesion to the plastic film after forming.

6 Claims, No Drawings

PROCESS FOR PRODUCING LAMINATED STEEL SHEET, LAMINATED STEEL SHEET, AND SURFACE-TREATED STEEL SHEET USED THEREFOR

TECHNICAL FIELD

The present invention relates to a surface-treated steel sheet for a laminate being excellent in tenacious adhesion of surface-treated steel sheet to a film after forming, and relates to a process for producing it.

BACKGROUND ART

Heretofore, as one used for a base plate of laminated steel sheet in which films are laminated on a steel sheet, there is a surface-treated steel sheet as disclosed in Japanese Patent Laid Open No. 138786 of 1995 (Heisei 7).

However, the above-mentioned surface-treated steel sheet was difficult to be applied for uses such as in deep-drawn can, can end and others in which it is hard to be formed, since the performance of tenacious adhesion of the surface-treated steel sheet to thermoplastic resin film was not specifically examined. Particularly, in thin deep-drawn can and others, it particularly needs to be excellent in tenacious adhesion of surface-treated steel sheet to a film in order that excellent corrosion resistance can be secured even after forming.

Accordingly, it is the object of the present invention to provide a surface-treated steel sheet used as a base sheet for manufacturing a laminated steel sheet being excellent in tenacious adhesion of the surface-treated steel sheet to film after forming, while improving drawbacks of conventional surface-treated steel sheet.

DISCLOSURE OF INVENTION

The process for producing a laminated steel sheet of the present invention is characterized in that a surface-treated steel sheet having an outermost chromium oxide layer with a specific surface area of 1.08 to 1.35 is used as a base sheet, and a plastic film is laminated on at least one side of said base sheet.

According to this process, a laminated steel sheet in which a surface-treated steel sheet having an outermost chromium oxide layer with a specific surface area of 1.08 to 1.35 is used as a base sheet, and a laminated steel sheet, produced by laminating at least one side of the said base sheet with a plastic film is provided.

And a specific surface area of an outermost chromium oxide layer in a surface-treated steel sheet as a base sheet is desirable to be 1.08 to 1.35.

The above-mentioned surface-treated steel sheet can be produced by forming an outermost chromium oxide layer on a steel sheet, and thereafter rinsing the outmost chromium oxide layer with water or warm water so that the value of a specific surface area of the outermost chromium oxide layer comes to 1.08 to 1.35.

A laminated steel sheet of the present invention has an excellent tenacious adhesion of surface-treated steel sheet to film after forming and can be applied for uses such as in thin deep-drawn can in which it is severely formed.

BEST MODE FOR CARRYING OUT THE INVENTION

Next, the present invention is explained in detail referring examples. A surface-treated steel sheet of the present invention comprises a steel sheet as a material for the surface-treated steel sheet, with a metallic chromium layer and a chromium oxide layer formed on at least one side. For a steel sheet as a material for the surface-treated steel sheet, conventional low carbon steel, hyper low carbon steel and high carbon steel and others are used.

Metallic chromium of from 30 $mg/m^2$ to 300 $mg/m^2$, desirably of from 30 $mg/m^2$ to 200 $mg/m^2$, is applied for metallic chromium layer. The lower limit is set to be 30 $mg/m^2$ by reason of giving corrosion resistance, and the upper limit is set to be 300 $mg/m^2$ by reason that even when the amount of metallic chromium is increased exceeding 300 $mg/m^2$, the effect of corrosion resistance is saturated and it is not economical.

Chromium oxide of from 5 $mg/m^2$ to 40 $mg/m^2$ as chromium is applied for chromium oxide layer. The lower limit is set to be 5 $mg/m^2$ by reason that when decreasing the amount of chromium oxide below it, tenacious adhesion of surface-treated steel sheet to film becomes poor, and the upper limit is set to be 40 $mg/m^2$ by reason that even when increasing the amount of chromium oxide exceeding it, the effect of corrosion resistance is saturated and the appearance comes to be darkened.

In order to secure excellent performance of a laminated steel sheet even after severe forming such as for thin deep-drawn can, the tenacious adhesion of surface-treated steel sheet to a film is particularly an important matter. There are several methods for improving the tenacious adhesion of surface-treated steel sheet to a film. However, in the present invention, the inventors noticed the condition of the surface of a surface-treated steel sheet which is brought into direct contact with a film. Namely, it was found that for the surface condition of a surface-treated steel sheet which is brought into direct contact with a film, the one having a certain surface area is excellent in the tenacious adhesion of it to a film. The concept of "surface area" hereon is different from that of the surface roughness measured by a profile measuring method, and is more approximate to the concept of what is called "surface activity".

A specific surface area mentioned in claims according to the present invention means a state of surface having extremely fine roughness which cannot be measured by a conventional profile measuring method, wherein by restricting a specific surface area of a surface-treated steel sheet within a certain range, tenacious adhesion of surface-treated steel sheet to a film is increased. Namely, in the present invention, the restriction of a specific surface area between 1.08 and 1.35 resulted in the remarkable improvement of tenacious adhesion of surface-treated steel sheet to a film. The value of the specific surface area is expressed by the ratio of the surface area of an example of the present invention (real area) to that of an assumed sample having no surface roughness (projected area=reference).

As thermoplastic resin film which is laminated on a surface-treated steel sheet of the present invention, the following can be given: (1) olefin resin film such as polyethylene, polypropylene, ethylene propylene copolymer, ethylene vinylacetate copolymer, ethylene acrylic ester copolymer, ionomer and others; (2) polyester such as polyethylene terephthalate, polyethylene naphthalate, polybutylene terephthalate, ethylene terephthalate/isophthalate copolymer and others; (3) polyamide such as nylon 6, nylon 66, nylon 11, nylon 12 and others, and;
(4) Polyvinyl Chloride, Polyvinylidene Chrolide and Others These thermoplastic resin films have different characteristics in terms of heat resistance, corrosion resistance, adhesion of film to steel sheet, and can be used properly according to contents of a food can. Further, when the adhesion of these thermoplastic resin film with a base sheet is not sufficient, for example, epoxy resin adhesive, phenol resin adhesive, amide resin adhesive, urethane resin adhesive, acid modified olefin resin adhesive, copolyamide resin adhesive, copolyester resin adhesive and a blend thereof can be laid between a thermoplastic resin layer and a surface-treated steel sheet.

Further, the thickness of thermoplastic resin films is desirable to be between 3 $\mu$m and 50 $\mu$m in general. When the thickness thereof is below 3 $\mu$m, the laminating efficiency is remarkably lowered, and besides pinholes are apt to be caused so that sufficient corrosion resistance cannot be obtained. On the other hand, when the thickness thereof exceeds 50 $\mu$m, it is not economical as compared with paints used widely in the field of can manufacturing. There are cases where thermoplastic resin films are laminated on both sides of a base sheet and where a thermoplastic resin film is laminated on one side of it.

Next, a method for producing a surface-treated steel sheet of the present invention is explained. First, a cold-rolled steel sheet is degreased and pickled. Thereafter, metallic chromium is deposited on the steel sheet as a cathode in a treating bath for electrolytic chromate coating mainly composed of chromic anhydride, in which small amount of one or more of sulfuric acid, sulfate, fluoric acid, fluoride, silicofluoride is/are added as autiliaries.

The chromium oxide is inevitably formed on the metallic chromium layer. However, the specific surface area of the present invention cannot be stably obtained within a certain range by this chromium oxide. It was considered that, a method for forming chromium oxide is an extremely important factor for obtaining the specific surface area within a certain range in the present invention. Accordingly, forming of chromium oxide was carried out under the limited condition of the conventional manufacturing method for tinfree steel sheet.

(Forming of Chromium Oxide)

The formation of chromium oxide is carried out using a treating bath containing $CrO_3$ of 20 to 100 g/l, in which fluoride is used as a typical autiliary. Further, sulfuric acid, silicofluoride, borofluoric acid or alkali metal salt thereof, or alkali metal salt thereof along with sulfuric acid is added to the treating bath. In general, fluorine auxiliary is apt to increase the specific surface area as compared with sulfuric acid.

The auxiliary is added in somewhat different amount according to kind thereof. However, the chromic acid concentration is suitably of the order from 2 to 20% by weight.

The temperature of bath is usually from 30 to 60° C. The current density of cathode is usually from 10 to 100 A/dm$^2$. When current density of cathode is not less than 50 A/dm$^2$, chromium hydrated oxide having large specific surface area is apt to be formed.

Further, if necessary, the chromium oxide layer having large specific surface area can also be formed partially dissolving the layer of hydrated chromium oxide by rinsing with water or warm water after the forming of the above-mentioned chromium oxide.

Favorable examples of the present invention are mentioned below in detail.

(EXAMPLES 1 TO 5 AND COMPARATIVE EXAMPLES 1 TO 3)

A cold-rolled steel sheet having the thickness of 0.16 mm was degreased and pickled, and thereafter plated with metallic chromium of 100 mg/m$^2$ using a treating bath including $CrO_3$: 100 g/l, and HF: 5 g/l, at the bath temperature of 45° C. and in the current density of 50 A/dm$^2$. After rinsing the steel sheet plated with metallic chromium with water, a chromium oxide layer was formed on it changing the composition of bath, current density and rinsing condition. Thus, the samples were prepared. The surface of the respective sample was measured by means of the atomic force microscope "Nanoscope III a", manufactured by Digital Instruments inc., by which an area of 1 $\mu$m-square on the surface of sample was measured with 512 picture elements per 1 line. Changing the field of view of measurement, 10 areas were measured. The average of the measured values was regarded as a real surface area, and specific surface area was defined by the ratio of the real surface area (numerator) against a projected area of the object to be measured in case where the surface of the sample was regarded as being perfectly flat (denominator=reference).

Further, a polyethylene terephthalate/isophthalate copolymer resin film was heat-laminated on the chromium oxide layer of the samples at 250° C. and thereafter the peeling length of the film was measured using the retort-peel testing method. The conditions for forming of chromium oxides, examples of the present inventions and comparative examples are shown in Table 1.

TABLE 1

|  | Bath Composition (g/l) | Current density (A/dm$^2$) | Rinsing condition | Amount of chromium oxide (mg/m$^2$) | Retort-peel test (mm) | Rate of increase in specific area (%) |
| --- | --- | --- | --- | --- | --- | --- |
| Example 1 | $CrO_3$: 35 g/l HF: 2 g/l | 50 | room temp., 5 sec | 15 | 15 | 12 |
| Example 2 | $CrO_3$: 50 g/l NaF: 3 g/l | 50 | room temp., 5 sec | 7 | 23 | 8 |
| Example 3 | $CrO_3$: 30 g/l NaF: 2 g/l | 100 | room temp., 5 sec | 20 | 12 | 15 |

TABLE 1-continued

|  | Bath Composition (g/l) | Current density (A/dm$^2$) | Rinsing condition | Amount of chromium oxide (mg/m$^2$) | Retort-peel test (mm) | Rate of increase in specific area (%) |
|---|---|---|---|---|---|---|
| Example 4 | CrO$_3$: 30 g/l KF: 2 g/l | 70 | 80° C., 3 sec | 17 | 10 | 26 |
| Example 5 | CrO$_3$: 30 g/l KF: 2 g/l | 70 | 90° C., 2 sec | 17 | 2 | 35 |
| Comp. example 1 | CrO$_3$: 35 g/l HF: 2 g/l | 50 | room temp., 5 sec | 5 | 50 | 2 |
| Comp. example 2 | CrO$_3$: 50 g/l NaF: 0.8 g/l | 80 | room temp., 5 sec | 8 | 50 | 3 |
| Comp. example 3 | CrO$_3$: 30 g/L KF: 2 g/l | 10 | room temp., 5 sec | 13 | 50 | 4 |

Evaluation of characteristic in Table 1 was carried out by the following method.

(1) Tenacious Adhesion of Surface-treated Steel Sheet to Film (Retort-peel test) A laminated steel sheet in which a polyethylene terephthalate/isophthalate copolymer resin film is laminated on one side of surface-treated steel sheet is cut into 30 mm width×100 mm. After cutting only the steel sheet portion (with the film being not cut), the laminated steel sheet is bent and mounted to a jig, and then load of 100 g was applied to the film. Under this state, the laminated steel sheet mounted to the jig was set in a retort oven, in which it was retorted under at 130° C., for 30 minutes. After that, the tenacious adhesion of film with the surface-treated steel sheet was evaluated measuring the peeling length of the film.

Any of the laminated steel sheets using the surface-treated steel sheet of the present invention revealed excellent results showing little peeling of film. On the other hand, in the laminated steel sheet of comparative examples, the film was caused peeling exceeding 50 mm from the upper portion of it.

INDUSTRIAL APPLICABILITY

In the present invention, the base plate for a laminated steel sheet has a specific surface area, which is limited within a certain range. Therefore, the surface treated steel sheet has tenacious adhesion to a film, and so it can be applied for uses such as thin deep-drawing in which it is severely formed.

What is claimed is:

1. A method for producing a laminated steel sheet, wherein a surface-treated steel sheet having an outermost chromium oxide layer, which is formed by electrolytic chromate treatment with a cathode current density of not less than 50 A/dm$^2$, with a specific surface area of 1.08 to 1.35 is used as a sheet and a plastic film is laminated on at least one side of said base sheet.

2. A surface-treated steel sheet for an olefin film or polyester film laminate, wherein the surface-treated steel sheet consists of a steel base sheet, an inner chromium metal layer, and an outermost chromium oxide layer having a specific surface area of 1.08 to 1.35 and the surface-treated steel sheet is produced by forming an outermost chromium oxide layer on a steel sheet as cathode by electrolytic chromate treatment with a current density of not less than 50 A/dm$^2$ to obtain a surface-treated steel sheet, followed by rinsing said outermost chromium oxide layer of the surface-treated steel sheet with water to produce an outermost chromium oxide layer with a specific surface area of 1.08 to 1.35.

3. A method for producing a surface-treated steel sheet for a plastic film laminate, comprising:
   forming an outermost chromium oxide layer on a steel sheet as cathode by electrolytic chromate treatment with a current density of not less than 50 A/dm$^2$ to obtain a surface treated steel sheet;
   rinsing the outermost chromium oxide layer with water to produce an outermost oxide layer with a specific area of 1.08 to 1.35 on the surface treated steel sheet; and
   laminating the outermost chromium oxide layer having a specific area of 1.08 to 1.35 on at least one side of the surface treated steel sheet with a plastic film.

4. A laminated steel sheet, comprising a surface-treated steel sheet consisting of a steel base sheet, an inner chromium metal layer, an outermost chromium oxide layer with a specific surface area of 1.08 to 1.35, and an olefin film or a polyester film laminated on at least one side of said base sheet, wherein said laminated steel sheet is produced by forming an outermost chromium oxide layer on a steel sheet as cathode by electrolytic chromate treatment with a current density of not less than 50 A/dm2 to obtain a surface treated steel sheet, followed by rinsing said outermost chromium oxide layer of said surface treated steel sheet with water to produce an outermost chromium oxide layer with a specific surface area of 1.08 to 1.35 and then by laminating at least one side of said surface treated steel sheet with an olefin film or a polyester film.

5. The laminated steel sheet of claim 4, wherein said water for rinsing said outermost chromium oxide layer is warm water.

6. The method of claim 3, wherein the water for rinsing the outermost chromium oxide layer is warm water.

* * * * *